Patented Jan. 13, 1931

1,788,571

UNITED STATES PATENT OFFICE

WILLIAM GARDINER AND HENRY D. STALEY, OF OAKLAND, CALIFORNIA, ASSIGNORS, BY DIRECT AND MESNE ASSIGNMENTS, TO VULCANITE, INC., OF OAKLAND, CALIFORNIA, A CORPORATION OF CALIFORNIA

ACTIVE MATERIAL FOR STORAGE BATTERIES

No Drawing.   Application filed February 2, 1927. Serial No. 165,508.

This invention relates to storage batteries, and more particularly to the active materials that are used in the preparation of the positive and negative plates.

In the usual lead-sulphuric acid accumulator, the rate of charge or discharge must be slow in order to prevent the plates from buckling. It is one of the objects of our invention to make it possible to charge and discharge such batteries at a much faster rate, yet without danger of buckling.

It is another object of our invention to provide a battery having larger capacity than those made in accordance with the prior art.

We are able to obtain these useful results due to our improved form of active material, and it is accordingly still another object of our invention to provide a novel type of active material that can fulfill these requirements.

It is still another object of our invention to improve in general, storage batteries of the character referred to.

Our invention possesses other advantages and objects, which will become apparent as the description proceeds. Although we shall describe but one form thereof, yet it will be obvious from the scope of our appended claims that variations in proportion, or in material, can be made without departing from the spirit of our invention.

We use as an important part of our active material for the positive plate, some material in which tantalum is incorporated, such as the usual tantalum oxide. This material is unaffected by acid, yet it can absorb large volumes of hydrogen, and also has the useful effect of strengthening the structure of the electrodes or plates. Preferably molybdenum is also used to provide strength.

Thus for the active material of the positive plate, we take about 100 pounds of lead dioxide, about 100 pounds of lead monoxide, about 4 pounds tantalum oxide, about 2 pounds molybdenum oxide, about 1 pound powdered carbon, about 4 ounces of chemically pure sulphate of ammonium, and about 1 pound pumice stone. All these materials are of course in powdered form. In order to make a thick paste of this mixture, sulphuric acid of density 1050 is added in sufficient quantity. After careful agglomeration, the paste can be applied to the plate or grid support. Some of the constituents could be omitted, such as pumice stone and molybdenum oxide, but we find it is better to use these.

The material for the negative plate can be prepared as follows: A mixture is made of about 100 pounds lead dioxide, about 1 pound bismuth oxide, about 100 pounds lead monoxide, about 1 pound glycerine, about 1 pound lamp black, and about 1 pound pure grain alcohol. This can be worked into a thick paste by proper addition of sulphuric acid of density about 1050 and applied to the plate.

After the plates are thus constructed, they can be worked in the usual manner by insertion in sulphuric acid and alternately charging and discharging the plates. It will be found that the pumice stone will be dissolved, and will leave innumerable small pores in the positive plates, thereby increasing its active surface.

A positive plate formed as described can withstand hard usage, is strong and is not liable to buckle.

We claim:

1. In a secondary battery, a positive element in which there is a composition containing a tantalum compound capable of absorbing gases.

2. In a secondary battery, a positive element including a composition of a tantalum compound capable of absorbing gases, and lead oxide.

3. An active material for secondary batteries, comprising a mixture of tantalum oxide, lead oxide, and an acid solution.

4. An active material for secondary batteries, comprising a mixture of substantially the following proportions: 100 pounds lead dioxide, 100 pounds lead monoxide, 4 pounds tantalum oxide, and sulphuric acid of about 1050 density, sufficient to make a thick paste.

In testimony whereof we have hereunto set our hands.

WILLIAM GARDINER.
HENRY D. STALEY.